US005458787A

United States Patent [19]

Rosin et al.

[11] Patent Number: 5,458,787

[45] Date of Patent: Oct. 17, 1995

[54] EXTRACTION OF CERTAIN METAL CATIONS FROM AQUEOUS SOLUTIONS

[75] Inventors: Richard R. Rosin, Riverside; William C. Schwerin, Mount Prospect, both of Ill.

[73] Assignee: UOP, Des Plaines, Ill.

[21] Appl. No.: 329,759

[22] Filed: Oct. 27, 1994

[51] Int. Cl.$^6$ ....... C02F 1/62

[52] U.S. Cl. ....... 210/719; 210/912; 210/913; 210/914; 75/721; 75/723

[58] Field of Search ....... 210/912–914, 210/719; 75/721, 723

[56] References Cited

U.S. PATENT DOCUMENTS

| | | | |
|---|---|---|---|
| 4,123,282 | 10/1978 | Winslow . | |
| 4,312,678 | 1/1982 | Landis | 210/692 |
| 4,333,770 | 6/1982 | Neuzil et al. | 210/674 |
| 4,849,112 | 7/1989 | Barder et al. | 210/674 |

*Primary Examiner*—Neil McCarthy
*Attorney, Agent, or Firm*—Thomas K. McBride; Eugene I. Snyder

[57] ABSTRACT

Carbonaceous pyropolymers possessing recurring units containing at least carbon and hydrogen atoms on their surface are effective in removing from solution metal cations having a standard reduction potential to their zerovalent state of greater than −0.2 volts. Their mode of action appears to be via reduction of the metal to the zerovalent state which then is deposited on the pyropolymer surface.

4 Claims, No Drawings

EXTRACTION OF CERTAIN METAL CATIONS FROM AQUEOUS SOLUTIONS

BACKGROUND OF THE INVENTION

One of the outstanding challenges in the environmental area is the cleanup of water generally. Legislation in various countries has paid increasing attention to permissible levels of impurities in water, especially where the stream may ultimately be used as a water source for human consumption. A class of impurities commonly found in streams is the class of metal ions, some of which may have long-term deleterious effects on life generally and on humans in particular. Thus, much attention has been paid to the removal of metal ions generally from aqueous streams.

Several methods have been used for metal ion removal. One general procedure has been to form insoluble compounds from metallic ions dissolved in aqueous streams and then either removing these directly by filtration, or agglomerating or flocculating the insoluble compounds as a filtration or settling aid. Another approach is to remove metallic ions by treating aqueous streams with an ion exchange resin. Yet another approach has been to remove metal ions using an adsorbent such as alumina or, even more frequently, carbon in one or another of its forms.

Several years ago there was described a class of materials characterized as carbonaceous pyropolymers possessing recurring units containing at least carbon and hydrogen atoms on the surface of the material. See U.S. Pat. Nos. 4,329,260; 4,471,072; 4,499,201; 4,536,358. These carbonaceous pyropolymers were said to have some adsorbent properties, which is not surprising in view of their relatively large surface area and porous nature. Although the carbonaceous pyropolymers superficially are related to various adsorptive carbons it also is clear that the carbonaceous pyropolymers are distinct from the latter, especially in having recurring units of carbon and hydrogen atoms on the surface of the material.

What we have found is that the carbonaceous pyropolymers described in the prior art are effective in removing metallic ions from aqueous solutions. Their effect is not indiscriminate; in fact the carbonaceous pyropolymers are quite specific with respect to the metal ions which are removed, and their specificity is itself quite unusual and different from anything in the prior art. In fact, the carbonaceous pyropolymers are effective in removing from aqueous solutions those metal cations which have a reduction potential relative to the zerovalent state of greater than about −0.2 volts. We believe this requirement arises because the carbonaceous pyropolymers remove metal ions not by adsorption, but rather by reducing the metal ions to their zerovalent state with concurrent plating of the metal onto the carbonaceous pyropolymer. Not only is removal of metal ions specific, but where they are effective the carbonaceous pyropolymers act rather quickly and are readily capable of reducing the concentration of some metal cations more than 1,000-fold.

SUMMARY OF THE INVENTION.

The invention within relates to the removal from aqueous solution of metal cations whose reduction potential to the base metal is greater than about −0.2 V. In an embodiment the metal cations are removed merely by contacting an aqueous solution containing the metal cations with an amount of carbonaceous pyropolymers possessing recurring units containing at least carbon and hydrogen atoms on the surface of the material. In a specific embodiment contacting is performed at a temperature between about 10° to about 90° C. In a more specific embodiment the carbonaceous pyropolymer is in the form of spheres. In yet another embodiment the carbonaceous pyropolymer is in the form of a powder. In yet another specific embodiment the metal cations removed are mercuric ions, Hg(II). Other embodiments and variants will become apparent from the ensuing description.

DESCRIPTION OF THE INVENTION

Although carbonaceous pyropolymers have been known for several years and are reported to be adsorbents-even though no specific examples seem to have been provided of the types of absorption effected- there seem to have been no attempts to use these materials as adsorbents for the removal of metal cations from aqueous solutions. When we attempted such removal we were quite surprised to find that carbonaceous pyropolymers did remove metal cations-but with great specificity and mediated by means other than adsorption. We observed that only those metal ions having a standard reduction potential to their zerovalent state (base metal) of greater than about −0.2 V were removed. We also noted that removal is likely effected by reduction of the metal cation to the base metal at the surface of the carbonaceous pyropolymer accompanied by plating out of the base metal as it forms. This mechanism of removal seems unique.

The carbonaceous pyropolymers used in the practice of our invention have been described in the U.S. Patents previously cited and need not be described in great detail here. When formed, the carbonaceous pyropolymers as structures are integral shaped replications of particle aggregates and are prepared by treating certain inorganic supports in the shape of spheres, plates, pellets, rods, fibers, monoliths, and so forth, with a pyropolymer precursor and thereafter pyropolymerizing said precursor by treatment at a temperature between 400° to about 1200° C. to form a carbonaceous pyropolymer possessing recurring units containing at least carbon and hydrogen atoms on the surface of the structure. The amount of carbonaceous pyropolymer which is deposited on the surface of the inorganic support will be sufficient to duplicate the physical shape and dimensions of the substrate material which acts as the inorganic support as well as a substantial portion of the pore structure thereof.

The inorganic material acting as a substrate has a surface area in the range of from about 1 to about 500 $m^2/g$ as well as a pore structure which generally includes both micropores and macropores. Micropores are defined as those pores of no more than 300 Å whereas macropores are those of greater than 300 Å in diameter. The pore structure of the shaped replications substantially duplicate the pore structure of the substrate material, this being especially true of the pore structure of macropores. The integral shaped replication possesses the original pore volume of the substrate material and, in addition, the pore volume which is occupied by the substrate will now be available to the integral shaped replication after removal of the substrate material. Illustrative examples of inorganic supports include alumina, zeolites, silica alumina, silica zirconia, and so forth.

The organic pyropolymer precursors which may be used in the preparation of the materials generally are hydrocarbons, whether aliphatic, alicyclic, or aromatic, although aliphatic halogen compounds, aliphatic oxygen compounds, aliphatic sulfur and nitrogen compounds and even organometallic compounds also may be employed. The hydrocarbons which are frequently used include alkanes, alkenes, alkynes, alkadienes, the corresponding alicyclic compounds and aromatic compounds. Particularly appropriate and preferred for use as the organopyrolyzable substance in the preparation of the carbonaceous pyropolymers are alicyclic hydrocarbons, especially cyclohexane and cyclohexene. Among the aromatic hydrocarbons may be mentioned naphthalene, benzene, anthracene, and toluene.

In summary, an extremely wide latitude can be exercised in the selection of the organic pyrolyzable substance, since virtually any organic material that can be vaporized, decomposed and polymerized on the refractory oxide by heating will suffice. The resulting carbonaceous pyropolymer will possess recurring units containing at least carbon and hydrogen atoms; however, depending upon the pyropolymer precursor the pyropolymer also may contain atoms such as nitrogen, oxygen, sulfur, phosphorus, and so on.

Following this, the inorganic support is chemically leached from the carbonaceous pyropolymer by treating the support-pyropolymer composite with either an acid or a base, thereby forming a high surface area carbonaceous pyropolymer which is a shaped replication of the original inorganic support. Leaching may be effected over a wide range of temperatures from about ambient (20°–25° C.) up to about 250° C. or more for a period from about 1 up to about 72 hours or more. It is to be understood that the operating parameters of the leaching step will vary over a wide range and will be dependent upon a combination of time, temperature, strength of the leaching solution, and so forth. Examples of acids which may be utilized to leach the inorganic support include inorganic acids such as phosphoric acid, sulfuric acid, nitric acid, hydrochloric acid, etc., organic acids as methylsulfonic acid, ethylsulfonic acid, toluenesulfonic acid, and so forth. Examples of bases which may be used as a leachant include strong bases such as sodium hydroxide, potassium hydroxide, lithium hydroxide, and so forth. It is to be understood that the aforementioned leaching materials are only representative of the class of compounds which may be used and that any chemical which is capable of removing the refractory inorganic oxide while retaining the high surface areas of the carbonaceous pyropolymer may be used.

The carbonaceous pyropolymer used in the removal of metal cations from aqueous solutions may be in any form desired, such as spheres, plates, pellets, rods, fibers, monoliths, powders, etc., but are most commonly used as either spheres or powders. The relative amounts of carbonaceous pyropolymer and aqueous solution containing dissolved metal ions which are to be removed is not critical. In the variant where the carbonaceous pyropolymer is used as a fixed bed through which the aqueous solution percolates there is clearly a high ratio of carbonaceous pyropolymer to aqueous solution within the fixed bed itself. It is equally apparent that as metal extraction proceeds the capacity of the carbonaceous pyropolymer to effect additional extraction decreases with a generally concomitant decrease in the rate of metals adsorption. This often is compensated by a decrease in the liquid hourly space velocity of the aqueous solution flowing through the fixed bed of carbonaceous pyropolymer. In any event, whether contact between the carbonaceous pyropolymer and the aqueous solution be as a fixed bed or a slurry, the amount of pyropolymer to be used will depend upon the concentration of the metal cation species in solution, the nature of the metal cations, the temperature, the history of the pyropolymer, and so forth. One skilled in the art will be readily able to accommodate such changes and adjust contacting conditions to optimize metal removal. Contact generally will be at or near ambient temperature, which means a temperature in the range of 15°–25° C., although contact may be at any temperature between about 5° C. and about 95° C. If one is willing to effect metals removal at superatmospheric pressure, temperature above 95° C. may be effected, although there is no apparent benefit to be derived therefrom.

The metals which are removed by the carbonaceous pyropolymers are those with a standard reduction potential to their zerovalent state of greater than about −0.2 V. As previously articulated, metals removal appears to occur via a two-stage process. In the first stage metals are reduced to the zerovalent state, presumably by aldehydic-like functionalities on the surface of the carbonaceous pyropolymer although this hypothesis is only speculative. The base metal thus formed by reduction is then plated out on the surface of the pyropolymer itself and is effectively removed from aqueous solutions. Among the metals which can be so removed are included platinum, palladium, gold, mercury, chromium, rhenium, copper, silver, and rhodium. The initial concentrations of metal cations in aqueous solution may be as low as about 5 ppm and as high as about 1 weight percent. It is believed that our invention may be most useful when the initial metal cation concentration is in the tens to thousands of ppm, e.g., from about 10 up to about 5,000 ppm.

The following examples are merely illustrative of our invention and are not limiting in any way.

EXAMPLE 1

Preparation of carbonaceous pyropolymers as spheres. The following is a description of a representative preparation. A spherical carbonaceous pyropolymer was prepared in two steps. The first step was to prepare a carbon coated alumina by pyrolyzing toluene onto a spherical gamma-alumina at 1500° F. at the rate of 0.25 gm of toluene/gm of alumina (volatile free basis)/hr for 2.5 hours (the approximate time needed to deposit 22–27% carbon). The second step was to leach the alumina to produce the carbonaceous pyropolymer by mixing the carbon coated alumina with 60 weight percent $H_2SO_4$ in the ratio of 22 gm acid/gin carbon coated alumina. The mixture was heated to 140° F. and held for 96 hrs. The resulting spherical carbonaceous pyropolymer was washed in deionized $H_2O$ at 190° F. for 48 hours.

The properties of the materials prepared as described above are listed below.

| | Carbon coated Alumina | Carbonaceous Pyropolymer |
|---|---|---|
| % C | 24.7% | N/A |
| % Al | 39.8% | 74 ppm |
| ABD | .72 gm/cc | .237 gm/cc |
| Piece Density | 1.13 gm/cc | .392 gm/cc |
| Surface Area | 100 $m^2$/gm | 764 $m^2$/gm |
| Pore Volume | 0.49 cc/gm | 1.86 cc/gm |

Preparation of carbonaceous pyropolymers as powder. The procedure for preparing powdered carbonaceous pyropolymer is similar to that for preparing spherical material. The carbon coated alumina was prepared by pyrolyzing toluene onto a beohmite-alumina powder at 1500° F. at the rate of 0.30 gm of toluene/gin of alumina (volatile free basis)/hr. for 3.0 hours or for a time long enough to deposit 30–35% carbon. This was mixed with 60 weight percent $H_1SO_4$ in the ratio of 20 gm acid/gm carbon coated alumina. The mixture is heated to 140° F. and held for 96 hours. The resulting carbonaceous pyropolymer was washed in deionized $H_2O$ at 190° F. for 48 hours. Properties of the resulting preparation are summarized below.

| | Carbon Coated Alumina | Carbonaceous Pyropolymer |
|---|---|---|
| % C | 31.8% | N/A |
| % Al | 35.4% | 410 ppm |
| ABD | .89 gm/cc | N/A |
| Surface Area | 78 $m^2$/gm | 510 $m^2$/gm |
| Pore Volume | 0.15 cc/gm | N/A |

EXAMPLE 2

Removal of metal cations by pyropolymer as spheres. Solutions of various metal salts were prepared and treated with carbonaceous pyropolymer. In each case 0.3 g of pyropolymer was used per gram of solution. Mixtures were permitted to remain in quiescent contact (no stirring) at ambient temperature (approximately 20° C.) for about 20 hours. Results are tabulated below.

TABLE 1

Removal of Metal Cations by Pyropolymer Spheres

| Metal Ion | Metal Salt | Initial Concentration (ppm) | Final Concentration (ppm) | Standard Reduction Potential (Volts) |
|---|---|---|---|---|
| Pd 2+ | $PdCl_4^{2-}$ | 2000 | 5.1 | +0.623 |
| Pd 2+ | $PdCl_4^{3-}$ | 2000 | 44[a] | +0.623 |
| Pd 2+ | $PdCl_4^{2-}$ | 200 | 0.6 | +0.623 |
| Pt 4+ | $PtCl_6^{2-}$ | 2000 | 2.7 | +1.47 |
| Au 3+ | $AuCl_4^-$ | 2000 | <0.5 | +0.994 |
| Ni 2+ | $NiCl_2$ | 2000 | 2000 | −0.23 |
| Ni 2+ | $Ni(NO_3)_2$ | 2000 | 1780 | −0.23 |
| Cd 2+ | $Cd(NO_3)_2$ | 2000 | ~2000 | −0.4026 |
| Pb 2+ | $Pb(NO_3)_2$ | 2000 | 680 ppm | −0.1263 |
| Cr 6+ | $Cr_2O_7^{2-}$ | 2000 | 250 ppm | +0.59 |

a. Activated charcoal used in place of pyropolymer for comparison.

EXAMPLE 3

Comparison of pyropolymer as spheres versus powder. The carbonaceous pyropolymer was used both as spheres and as a powder in the removal of mercury and arsenic from aqueous solutions with results summarized in Table 2. Powders appear to be more effective than spheres, but this difference might just result from pore plugging during metals removal. The pyropolymer does not seem to be very effective in the removal of arsenic; $AsO_4^{3-}$in HCl has a reduction potential of +0.82 volts.

TABLE 2

Comparison of Pyropolymer as Spheres and Powder

| Metal | Species | Leaco Form | Initial Conc. (ppm) | Final Conc. (ppm) |
|---|---|---|---|---|
| Hg 2+ | Hg $(NO_3)$2 | Spheres | 4620 | 400 |
| Hg 2+ | Hg $(NO_3)$2 | Powders | 4620 | 5.5 |
| Hg 2+ | Hg $(NO_3)$2 | Spheres | 43 | <1 |
| Hg 2+ | Hg $(NO_3)$2 | Powders | 43 | <1 |
| As +5 | $H_3AsO_4$ | Spheres | 101 | 84 |
| As +5 | $H_3AsO_4$ | Powders | 101 | 81 |

What is claimed is:

1. A process of reducing the concentration in aqueous solution of metal cations having a standard reduction potential to their zerovalent state of greater than −0.2 volts comprising contacting at a temperature between about 10° C. and about 90° C. an aqueous solution of said metal cation with a carbonaceous pyropolymer which possesses recurring units containing at least carbon and hydrogen atoms on its surface to effect reduction of said metal cation to the zerovalent metal and plating said zerovalent metal on the carbonaceous pyropolymer, said carbonaceous pyropolymer resulting from pyropolymerization in a reducing atmosphere at a temperature between 400° and about 1200° C. a pyropolymer precursor selected from the group consisting of aliphatic, alicyclic, and aromatic hydrocarbons, aliphatic halogen compounds, aliphatic oxygen compounds, aliphatic sulfur compounds, and aliphatic nitrogen compounds.

2. The process of claim 1 where said reduction is effected at a temperature between about 15° C. and about 25° C.

3. The process of claim 1 where the metal is selected from the group consisting of platinum, palladium, gold, mercury, chromium, rhenium, copper, silver, and rhodium.

4. The process of claim 1 where the concentration of the metal cation in solution is between about 5 ppm up to about 1 weight percent.

* * * * *